(12) United States Patent
Humphrys et al.

(10) Patent No.: US 12,110,107 B2
(45) Date of Patent: Oct. 8, 2024

(54) INJECTABLE RIB FOOT CLEAT

(71) Applicant: AIRBUS OPERATIONS LIMITED, Bristol (GB)

(72) Inventors: Benjamin Humphrys, Bristol (GB); Dave Gibbons, Bristol (GB); Carl Rice, Bristol (GB); James Powis, Bristol (GB); Martin Cribb, Bristol (GB); David Nathaniel Wilson, Bristol (GB); Michael Reilly, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 123 days.

(21) Appl. No.: 17/673,256

(22) Filed: Feb. 16, 2022

(65) Prior Publication Data
US 2022/0258849 A1 Aug. 18, 2022

(30) Foreign Application Priority Data
Feb. 18, 2021 (GB) .................... 2102308

(51) Int. Cl.
*B64C 3/18* (2006.01)
*B64C 3/24* (2006.01)
*F16B 11/00* (2006.01)
*F16J 15/06* (2006.01)

(52) U.S. Cl.
CPC .......... *B64C 3/187* (2013.01); *B64C 3/182* (2013.01); *B64C 3/24* (2013.01); *F16B 11/006* (2013.01); *F16J 15/062* (2013.01)

(58) Field of Classification Search
CPC ................. B64C 1/064; B64C 3/182
See application file for complete search history.

(56) References Cited

U.S. PATENT DOCUMENTS

| | | |
|---|---|---|
| 8,167,245 B1 | 5/2012 | Koehler et al. |
| 10,279,922 B2 | 5/2019 | Perez Diaz et al. |
| 2012/0148801 A1* | 6/2012 | Kwon ............ B64C 3/187 428/157 |
| 2014/0186099 A1 | 7/2014 | Klaukien |

(Continued)

FOREIGN PATENT DOCUMENTS

| | | |
|---|---|---|
| CN | 103347781 | 10/2013 |
| EP | 3 521 166 | 8/2019 |

(Continued)

OTHER PUBLICATIONS

European Technical Assessment ETA-08/0007, Aug. 11, 2015, 37 pages, https://www.itwconstruction.ee/en/Connectors/Beam-Shoe/Beamshoe-TypeI_pBALTIC_89062sharp0.htm#/technical.dl.

(Continued)

*Primary Examiner* — Timothy D Collins
*Assistant Examiner* — Eric Acosta
(74) *Attorney, Agent, or Firm* — Nixon & Vanderhye P.C.

(57) ABSTRACT

A rib foot cleat for sealing around a stringer passing through a rib mouse hole in an aircraft assembly. The rib foot cleat has a body for attaching to a rib at a rib mouse hole and defines a cleat channel configured to be arranged over the stringer. The rib foot cleat also has an injection hole through the cleat body which is in fluid communication with the cleat channel, to allow sealant material to be injected through the injection hole in to the cleat channel for sealing around the stringer.

21 Claims, 6 Drawing Sheets

(56) References Cited

U.S. PATENT DOCUMENTS

2014/0284426 A1* 9/2014 Erickson .................. B64C 1/06
244/135 R
2016/0355273 A1 12/2016 Perez Diaz et al.

FOREIGN PATENT DOCUMENTS

| EP | 3 656 657 | 5/2020 | | |
|----|-----------|--------|---|---|
| EP | 3 689 757 | 8/2020 | | |
| EP | 3 702 266 | 9/2020 | | |
| EP | 3702266 A1 * | 9/2020 | .............. | B64C 3/18 |
| GB | 2535518 | 8/2016 | | |
| GB | 2535518 A * | 8/2016 | .............. | F16B 37/14 |
| GB | 2579216 | 6/2020 | | |

OTHER PUBLICATIONS

Combined Search and Examination Report for GB Application No. 2102308.0 dated Nov. 30, 2021, 11 pages.
"Beam Shoe", www.itwconstruction.ee/en/Connectors/Beam-Shoe_fBALTIC_219233.htm, retrieved on Oct. 22, 2021, 3 pages.
European Search Report EP 22155795 mailed Dec. 19, 2022, 10 pages.

* cited by examiner

INJECTABLE RIB FOOT CLEAT

RELATED APPLICATION

This application is incorporated by reference and claims priority to United Kingdom patent application GB 2102308.0, filed Feb. 18, 2021.

FIELD

The present invention relates to a rib foot cleat for sealing around a stringer passing through a rib mouse hole in an aircraft assembly, an aircraft assembly with the rib foot cleat, a method for sealing a mouse hole, a tool for forming a lip on a rib foot cleat, and a method for forming a lip on a rib foot cleat.

BACKGROUND

Aircraft wings extend spanwise from a root end nearest the fuselage to a tip end. The wing has an upper wing cover having an upper aerodynamic surface, a lower wing cover having a lower aerodynamic surface, a leading edge and a trailing edge. Internally the wing is typically configured to provide a fuel carrying volume. A plurality of ribs extend generally chordwise between a front spar and a rear spar, the front and rear spars extending generally spanwise. The ribs are coupled to the spars and the covers to create a 'wing box' structure which is the main load bearing structure of the wing. The ribs may also be used to segment the fuel carrying volume of the wing into different bays. Stringers, or longitudinal reinforcing members, extend generally spanwise along the length of the wing on the interior side of the upper and lower wing covers and pass through 'mouse holes' in the ribs or rib feet. Fuel may freely move through the mouse holes in the rib into the neighbouring bay, or the mouse hole may be sealed to prevent the flow of fuel. In order to accommodate potential geometrical variations of the aircraft component shapes or dimensions the mouse holes are necessarily fairly large.

A 'dry bay' may be located within the wing directly above the engine/pylon for an aircraft with under-wing mounted engines. The dry bay does not contain any fuel and is a safety mechanism in case of engine failure, e.g. a rotor disk burst. However, the dry bay shares at least one rib with an adjacent fuel bay. Therefore, a number of mouse holes need to be sealed to prevent fuel leaking into the dry bay and keep the dry bay 'dry'.

Sealing the dry bay presents a number of challenges, as it has a large number of complex joints to the rest of the wing. Due to the difficulty of gaining access to the area within the assembled wing, reliable sealing of the dry bay mouse holes is particularly difficult. Furthermore, the gaps between the mouse holes and the stringers is very large, the shape of the stringer is not simple and dry bay rib mouse holes are obliquely angled with the dry bay rib, which provide further sealing challenges. Accordingly, providing a repeatable and effective solution to reliably seal each the dry bay rib mouse hole can be difficult to achieve. Existing solutions for sealing rib mouse holes include attaching a metal cleat over the stringer and fastening to the adjacent wing cover and rib at the mouse hole location, and filling the cleat with pieces of flexible open-cell polyurethane foam filled with curable sealant. The foam parts are custom trimmed for each location, and so are costly to procure and time consuming to assemble to achieve the required high level of fluid tightness.

SUMMARY

According to an aspect of the invention, there is provided a rib foot cleat for sealing around a stringer passing through a rib mouse hole in an aircraft assembly, the rib foot cleat comprising: a cleat body for attaching to a rib at a rib mouse hole and defining a cleat channel configured to be arranged over a stringer; and an injection hole through the cleat body in fluid communication with the cleat channel to allow a sealant material to be injected through the injection hole in to the cleat channel for sealing around the stringer.

A cleat is a component fastened to support and hold something in position. A rib is a chordwise extending structural component of an aircraft wing. A rib mouse hole is a hole in an edge of a rib. A stringer is a longitudinal reinforcing member. Here, the rib foot cleat is positioned over a stringer and is attached to the rib where the stringer passes through the rib mouse hole, and is used to support and hold the sealant in place to seal around the stringer.

The cleat channel may be generally U-shaped and may terminate at a first channel opening rim on one side of the cleat body and at a second channel opening rim on an opposite side of the cleat body. A channel lip may extend at least partially around an interior of the cleat channel adjacent the first and/or second channel opening rim.

The channel lip may be configured to delimit the sealant material that is injected through the injection hole.

The channel lip may optimise the amount of sealant required to fully seal the joint. The channel lip may guide any excess sealant that may otherwise protrude from the first and/or second channel opening rim and be guided towards the stringer.

The channel lip may be made of sealant. The channel lip may be made of a curable material.

The channel lip may be of the same material as the injected sealant to create a seal. The injected sealant may be curable to the channel lip.

The channel lip may be made of silicone, polyurethane, polysulphide or silane-modified polymer.

The channel lip may be made of closed cell foam.

The rib foot cleat may comprise a first attachment flange for attaching the cleat body to the rib, and/or a second attachment flange for attaching the cleat body to a foot of the stringer.

A further aspect of the invention provides an aircraft assembly, comprising a stringer reinforced cover and a rib having a mouse hole with the stringer passing through the mouse hole in the rib, and a rib foot cleat according to the first aspect arranged over the stringer at the rib mouse hole and with cured sealant material inside the rib foot cleat which seals around the stringer passing through the rib mouse hole.

The rib may have a plurality of mouse holes each having a respective stringer passing through, and a respective rib foot cleat with cured sealant material which seals around the respective stringer passing through the respective rib mouse hole.

The rib may form a fuel tank boundary and the rib foot cleat and sealant may form a fluid-tight seal.

The injected sealant may fully seal one side of the rib from the other.

The rib may form a boundary between a fuel tank and a dry bay, or between a fuel tank and another fuel tank.

In a further aspect of the invention there is provided a method a method of sealing around a stringer passing through a rib mouse hole in an aircraft assembly, by providing a rib and a stringer extending through a mouse hole of the rib, arranging a rib foot cleat over the stringer, attaching the rib foot cleat to the rib; injecting sealant through the injection hole in the rib foot cleat to fill a gap between the cleat channel and the stringer with sealant so as to seal the gap.

The cleat channel may terminate at a first channel opening rim on one side of the cleat body and at a second channel opening rim at an opposite side of the cleat body, and the channel lip may be formed so as to extend at least partially around an interior of the cleat channel adjacent to the first and/or second channel opening rim.

Holes may be drilled through the rib foot cleat and the rib after arranging the rib foot cleat over the stringer and before attaching the rib foot cleat to the rib.

The lip(s) may be formed after drilling off the holes in the rib foot cleat and before the rib foot cleat is attached to the rib.

Drilling the holes in the rib foot cleat enables the rib foot cleat to be correctly positioned over the stringer before the sealant is injected. This provides a more effective seal as the rib foot cleat may be positioned centrally over the stringer, accommodating tolerances in the assembly.

The sealant may be injected in the injection hole by means of pneumatic assistance, preferably by a sealant gun.

This provides a fast and repeatable method of introducing the sealant into the rib foot cleat, reducing the time of manufacture and assembly.

The flow of injected sealant may be stopped when sealant escapes from the cleat channel.

Visually observing the sealant starting to escape provides an easy method of verifying when the sealant has completely filled the rib foot cleat, and therefore formed a reliable seal.

In a further aspect of the invention, there is provided a tool for forming a lip on a rib foot cleat having a cleat body defining a cleat channel configured to be arranged over a stringer, and an attachment flange for attaching the cleat body to a rib, wherein the cleat channel is generally U-shaped and terminates at a first channel opening rim on one side of the cleat body and at a second channel opening rim on an opposite side of the cleat body, the tool comprising: a tool body configured to be placed against the cleat channel of the rib foot cleat, the tool body having at least one recess which extends at least partially around an interior of the cleat channel adjacent the first and/or second channel opening rim; and a locating feature for aligning the tool body against the cleat body of the rib foot cleat.

The tool body may comprise two respective recesses that extend around an interior of the cleat channel adjacent the respective first and second channel opening rim.

The tool may be collapsible. The tool body may be flexible to enable the collapsing of the tool. Alternatively the tool body may be more rigid and incorporate a hinge between tool body portions.

This enables the tool body to be removed easily from the rib foot cleat without damaging the formed channel lips.

The tool body may have at least one handle for manually collapsing the collapsible tool.

The tool may be made of nylon so that sealant does not adhere to the tool.

This allows the tool to be flexible while not promoting adhesion of the sealant to the tool itself. This encourages the channel lips to adhere to the rib foot cleat as opposed to the tool.

In a further aspect of the invention, there is provided a method of forming a lip on a rib foot cleat having a cleat body defining a cleat channel configured to be arranged over a stringer, and an attachment flange for attaching the cleat body to a rib, wherein the cleat channel is generally U-shaped and terminates at a first channel opening rim on one side of the cleat body and at a second channel opening rim on an opposite side of the cleat body, the method comprising providing the tool, inserting the tool in the rib foot cleat such that the tool body is be placed against the cleat channel of the rib foot cleat; injecting sealant in the at least one recess of the tool body; curing the sealant and removing the tool.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
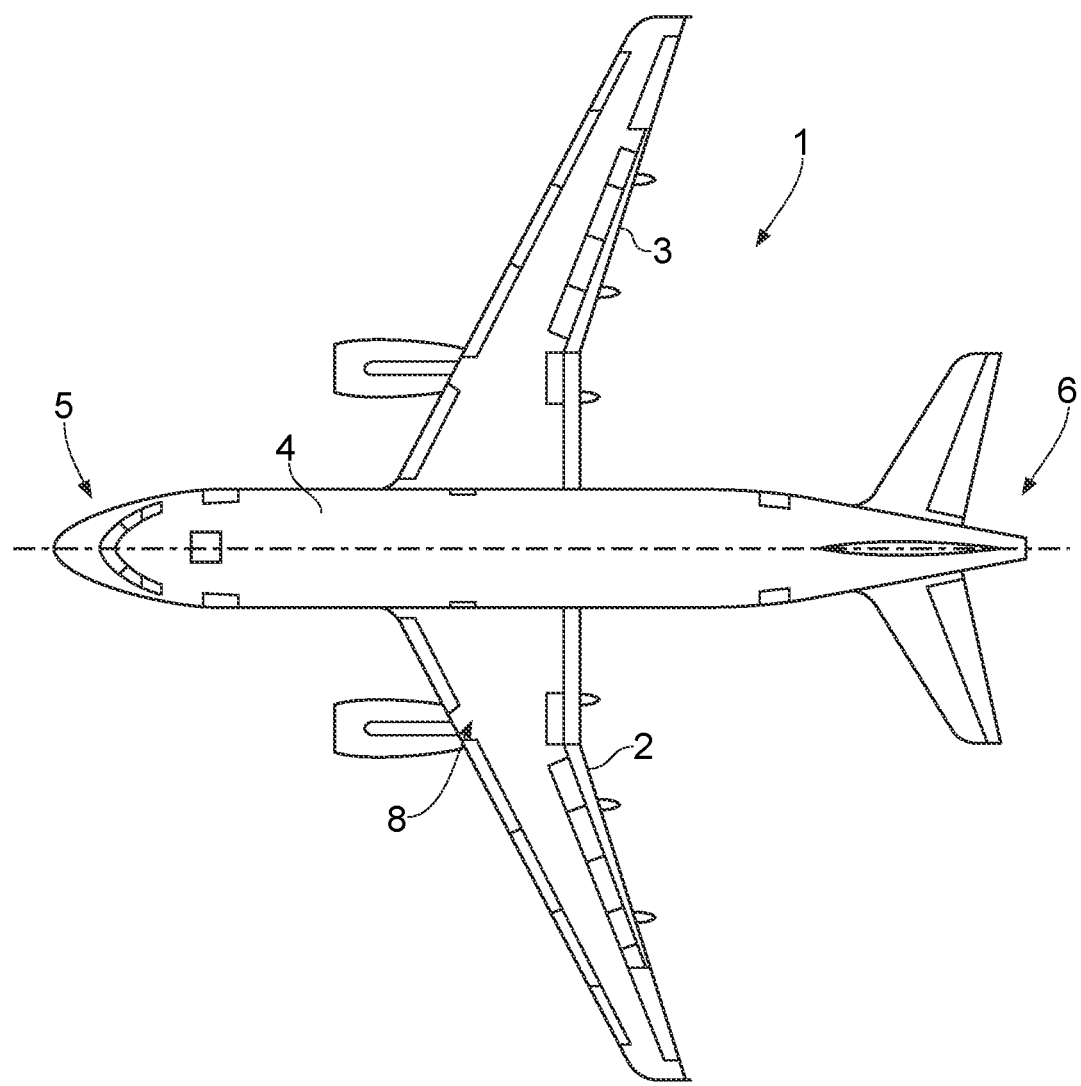
FIG. 1 shows a plan view of an aircraft.

FIG. 1 shows an aircraft 1 with starboard wing 2, port wing 3, fuselage 4, a nose end 5 and a tail end 6. The aircraft 1 is a typical jet passenger transonic transport aircraft but the invention is applicable to a wide variety of fixed wing aircraft types, including commercial, military, passenger, cargo, jet, propeller, general aviation etc. Each wing 2,3 has an upper and lower wing covers 18, which are strengthened and stiffened by a plurality of stringers 14 which extend generally spanwise along the wing from the wing root near the fuselage to the wing tip. Internally the wing is configured to provide a fuel carrying volume.

A plurality of ribs 12 extend generally chordwise between a front spar and a rear spar (not shown), the front and rear spars extending generally spanwise. The ribs are coupled to the spars and the covers to create a 'wing box' structure which is the main load bearing structure of the wing. The ribs also segment the fuel carrying volume of the wing into different bays.

A 'dry bay' 8 is located adjacent and above an under-wing mounted main engine on the wing 2. The dry bay does not contain fuel so that in the event of engine malfunction or failure, where components of the engine may directly impact the wing, no leak of fuel occurs. The dry bay is adjacent to at least one fuel tank bay in the wing. The port wing 3 is constructed similarly.

Figure 2:
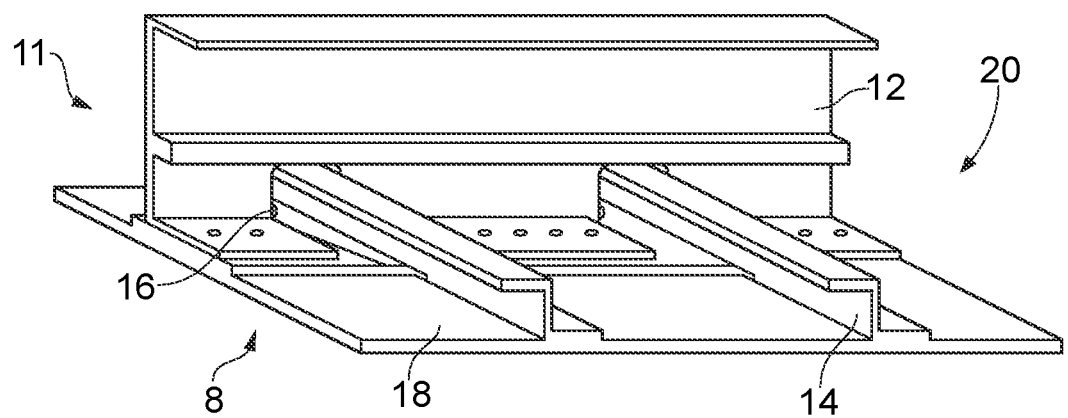
FIG. 2 shows the internal detail of part of an aircraft wing assembly with a stringer reinforced cover and a rib.

FIG. 2 shows a portion of an aircraft wing assembly 20 of the wing 2, in particular the rib 12, stringers 14, lower wing cover 18 and rib mouse holes 16 through which the respective stringers 14 pass. The rib 12 forms a boundary between a fuel tank bay 11 and the dry bay 8. Rib 12 extends generally perpendicular, vertically away from lower cover 18 and is connected to the lower cover at a lower end by rib feet and is connected to the upper cover at an upper end by rib feet (not shown). Rib 12 has a plurality of mouse holes 16 at the lower edge and a plurality of mouse holes at the upper edge (not shown). The rib mouse holes are formed in the rib to enable each of the stringers to pass though the rib without causing the requirement to fabricate any joints in the stringers.

Stringers 14 extend continuously through the respective rib mouse holes 16 of the rib 12. The stringer profile in FIG. 2 is shown to be a 'Z' stringer, however, it will be understood that any number of stringer profiles may be used, such as omega, top-hat, C-shaped; or any other suitable design. The mouse holes are sized to closely match the profile of the stringer to minimise the gap between the stringer and the rib, whilst allowing a clearance.

Between at least some fuel bays, fuel may be allowed to move freely through the mouse holes in the rib. However between other fuel bays this may be undesirable, and between a fuel bay and the dry bay 8 the rib 12 must be sealed. This is achieved by sealing around the stringer 14 that passes through each mouse hole 16.

Figure 3:
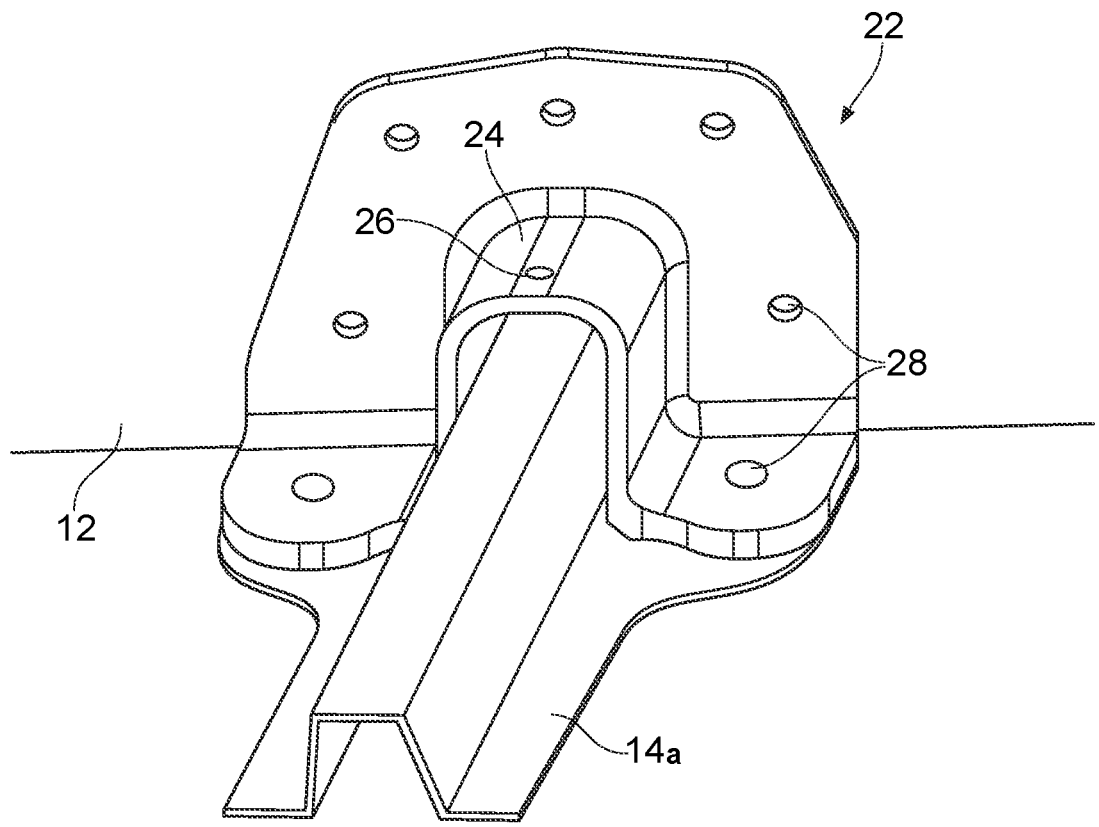
FIG. 3 shows a rib foot cleat arranged over a stringer and attached to a rib.
Figure 4:
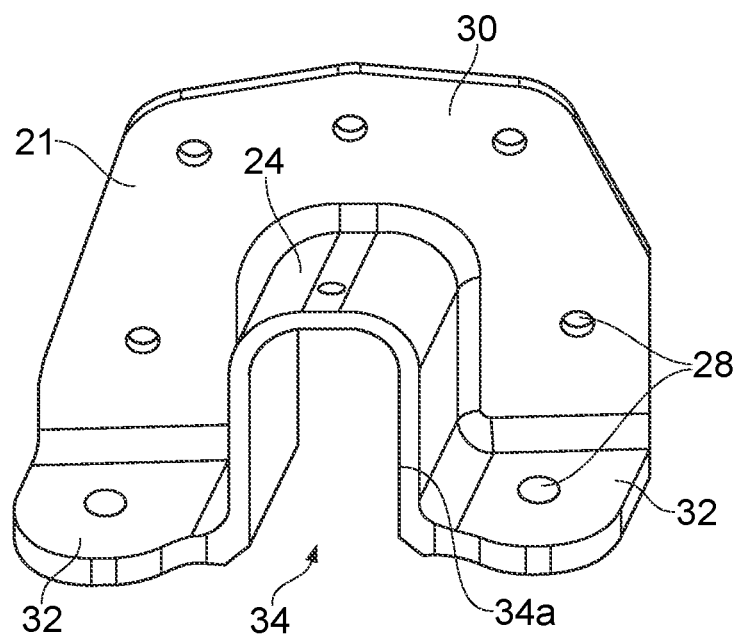
FIG. 4 shows a rib foot cleat.

FIG. 3 shows the detail of an aircraft assembly 22 in which a rib foot cleat 21 is arranged over stringer 14a. In FIG. 3 the stringer 14a has a top hat profile different than the Z-shaped stringer 14 but any suitable stringer profile may be used. The rib foot cleat may be made of any suitable material, such as metal or a composite material. The rib foot cleat may be additively manufactured. FIG. 4 shows the rib foot cleat 21 alone for clarity.

The rib foot cleat 21 has a body 24 defining a cleat channel 34 configured to be arranged over the stringer 14a. The cleat body may have a bell-shaped, arched or roof portion extending over the cleat channel 34. The rib foot cleat 21 is arranged on one side of the rib 12, and is preferably on the inside of the dry bay 8. However, two rib foot cleats 21 may be placed one on either side of one mouse hole 16.

The rib foot cleat body 24 has a first attachment flange 30 for attaching the cleat body to the rib 12. A second attachment flange 32 extends perpendicular to the first attachment flange 30. The second attachment flange is configured for attaching the cleat body to a foot of the stringer 14a and the wing cover 18. The rib foot cleat body may be a unitary structure comprising the first and second attachment flanges 30, 32 and the arched portion defining the cleat channel 34. The second attachment flange 32 may be formed in two portions, one on either side of the cleat channel 34. Each attachment flange 30, 32 has a number of fastener holes 28, used to secure the rib foot cleat 21 to the rib 12 and stringer 14a/cover 18 respectively.

The rib foot cleat channel 34 may be generally U-shaped and terminates at a first channel opening rim 34a at one side of the cleat body 24 and a second channel opening rim 34b (shown in FIG. 6) at the opposite side of the cleat body 24. There is an injection hole 26 through the cleat body that is in fluid communication with the cleat channel 34 to allow sealant to be injected through the injection hole 26 in to the cleat channel 34 for sealing around the stringer 14a. The injection hole 26 may be formed in apex of the arched portion of the rib foot cleat body 24. The injection hole may be formed by drilling or through any suitable method. It will be understood that the injection hole 26, or a plurality of injection holes, may be positioned in any suitable area of the cleat body 24 so as to be placed in fluid communication with the cleat channel 34. Preferably a single, apex located injection hole 26 is provided.

The rib foot cleat channel 34 is shown in FIG. 4 as being generally U-shaped and arranged over stringer 14a, which has a top-hat stringer profile. However, it will be understood that any suitable shape of stringer profile, such as C-shaped, Z-shaped; or any other suitable design may be used. The rib foot cleat channel 34 and rib foot body 30 may be sized and modified to closely match the profile of the stringer to minimise the gap between the stringer and rib foot cleat channel 34, whilst permitting the rib foot cleat channel 34 to be placed over the stringer and for attachment of the rib foot cleat body 30 to the rib and to the foot of the stringer.

To prevent sealant escaping from the cleat body 24 through the channel opening rims 34a, 34b, the rib foot cleat 21 may further include a channel lip 56 (shown in FIG. 7) that extends at least partially around the interior of the cleat channel 34 or adjacent to the first and/or second channel opening rim, 34a and 34b. The channel lip 56 is positioned in a way to act as a barrier between the channel body 34 and the external environment and preferably, to delimit the inserted sealant from exuding during the injection process. The channel lip 56 is preferably formed along the periphery of the channel rims 34a and 34b. However, it will be understood that a number of channel lip designs may be employed to seal a gap between the cleat body 24 and the stringer. For example, a single lip may be formed along the centre of the cleat body 24, such that when sealant is injected, only one half of the cleat channel 34 is filled. Alternatively, the channel lips may be formed partially down the peripheral edges 34a and 34b, or from a set distance from the peripheral edge into the cleat channel.

Figure 9:
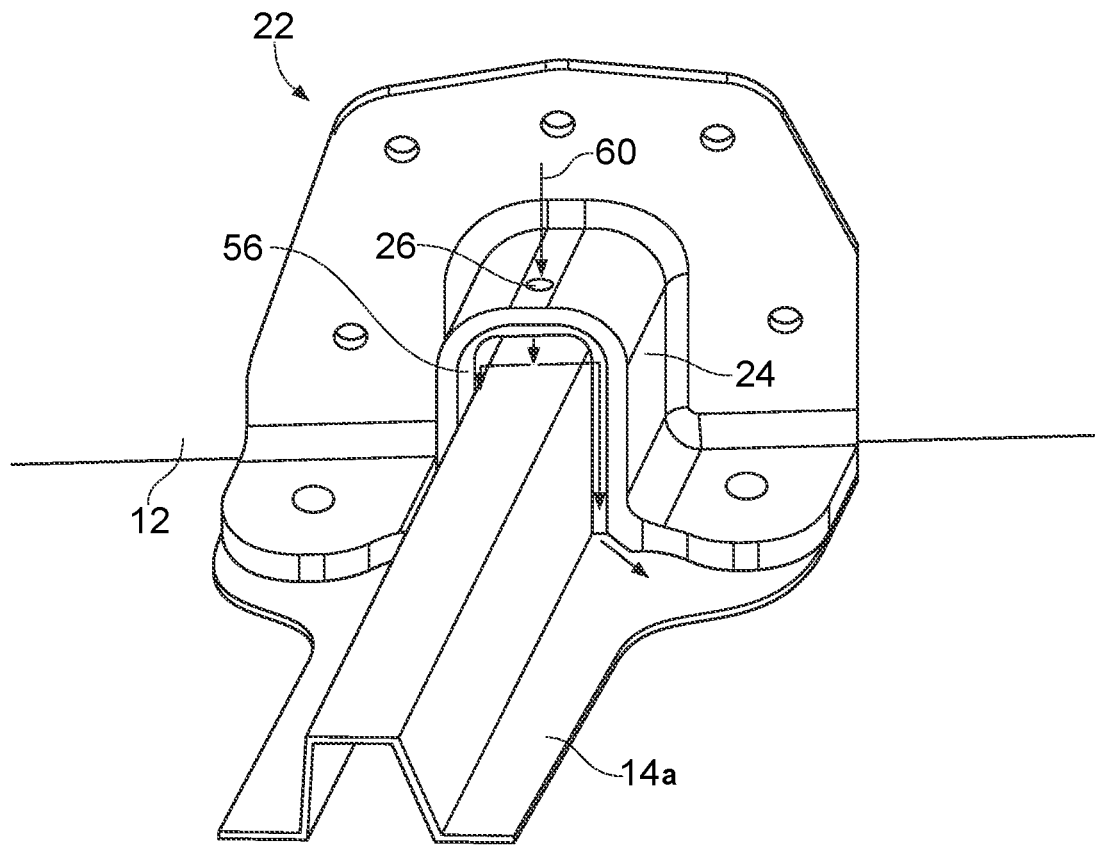
FIG. 9 shows the assembly of FIG. 3 and the flow of injected sealant.

Preferably, two channel lips 56 are formed adjacent to the respective first and second channel opening rim 34a and 34b. The channel lips are preferably formed before the rib foot cleat 21 is attached to rib 12 and stringer 14a. The channel lips may be formed from sealant. The lips may be made of any curable sealant, such as silicone, polyurethane, polysulphide, or silane-modified polymer. Preferably, the same material used for forming channel lips 56 is used to inject into the injection hole 26 and into the rib foot cleat channel 34. The channel lips 56 are formed to guide the injected flow of sealant 60 in to the gap 66 so that it protrudes from the bottom of the rib foot cleat 21, as shown in FIG. 9, indicating that the injected sealant has completely filled the area between the stringer 14a and rib foot cleat body 24.

Figure 7:
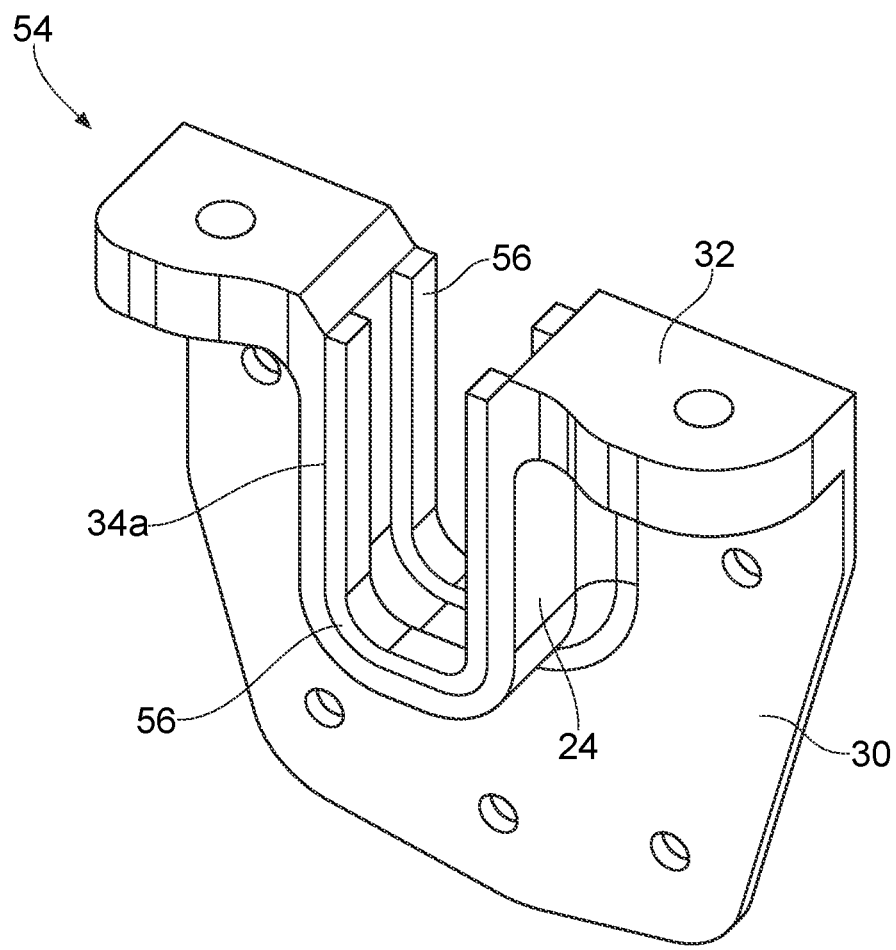
FIG. 7 shows a rib foot cleat with channel lips formed.

The channel lips 56 shown in FIG. 7 are shown as being generally cuboid shaped with a rectangular cross-section. However, it will be understood that any suitable channel lip 56 shape may be formed within the rib foot cleat channel 34. For example, the channel lips 56 may be formed with a triangular cross-section, with a base contacting and formed at least partially around the interior of the cleat channel 34 and an apex of the triangle extending into rib foot cleat channel 34.

Alternatively, the channel lips 56 may be formed with a semi-circular cross section, with a base contacting and formed at least partially around the interior of the cleat channel 34 and a rounded peak extending into the rib foot cleat channel 34.

When the channel lips 56 are formed with an apex or a rounded peak, the channel lips 56 are easier to detach from the tool 40 after curing (discussed further below) and compress more easily against the stringer. This enables the channel lips 56 to be manufactured easier and quicker. The channel lips 56 also conform to the profile of the stringer 14a better once the rib foot cleat body 30 is arranged over the stringer, improving the seal between the rib foot cleat and the stringer.

Alternatively, the channel lips 56 may be formed separately from the tool 40 and the rib foot cleat. The pre-formed channel lips 56 may then be adhered on to the rib foot cleat channel 34 using any suitable form of adhesion. The adhesive may be of the same material used to form the channel lips 56.

Alternatively, the channel lips 56 may be formed by closed cell foam that is positioned within the rib cleat channel 34. The closed cell foam may be positioned within the channel, or it may be adhered on to the walls of the channel 34. The manufacturing and assembly time of the sealed mouse hole may be reduced if closed foam is used for the channel lips, as less time may be required to adhere the closed cell foam than to form the channel lips of curable sealant.

Figure 5:
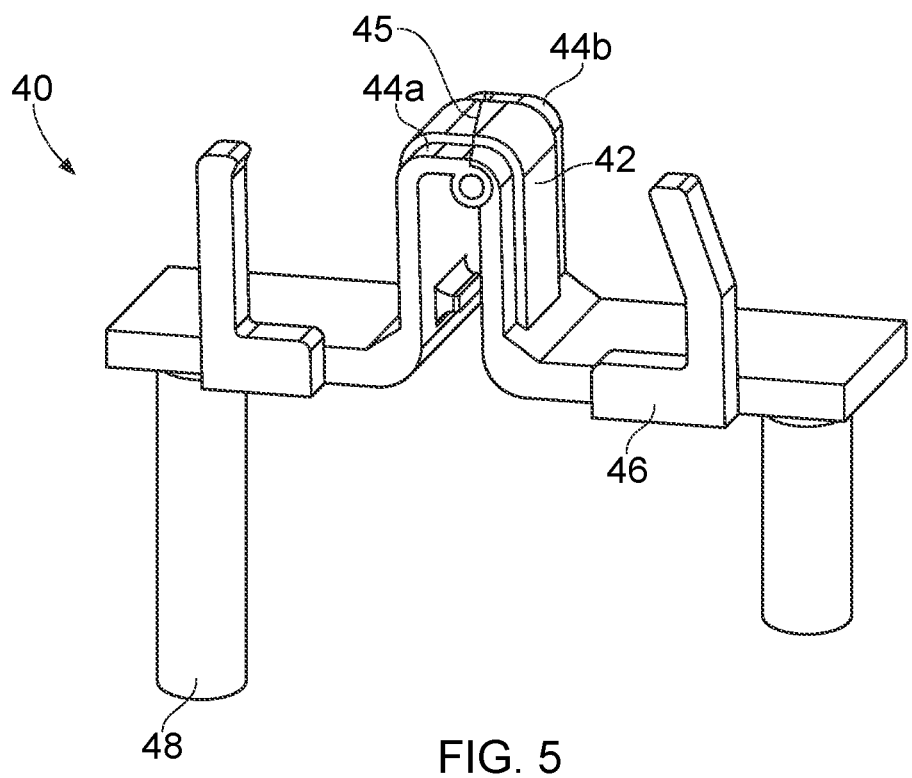
FIG. 5 shows a tool for forming a channel lip on a rib foot cleat.

FIG. 5 shows an exemplary tool 40 that is used to for forming the channel lips 56 from curable sealant material on the rib foot cleat 21. As shown, the tool 40 has a profile that substantially corresponds to the profile of the rib foot cleat body 24. As such, it will be understood that a number of profiles of tool 40 may be used, depending on the profile of the rib foot cleat body 24. Tool 40 in FIG. 5 is shown as being substantially U-shaped in profile. The tool has two recesses 44a and 44b that correspond to the preferred positioning of the channel lips 56 along the first and second channel rim opening, 34a and 34b. These recesses extend at least partially along the interior of the cleat channel 34, adjacent to the first and second channel opening rim, 34a and 34b. The tool 40 may alternatively only have one recess, or multiple recesses configured to correspond to the channel lips 56 that are to be formed on the rib foot cleat channel 34.

Figure 6:
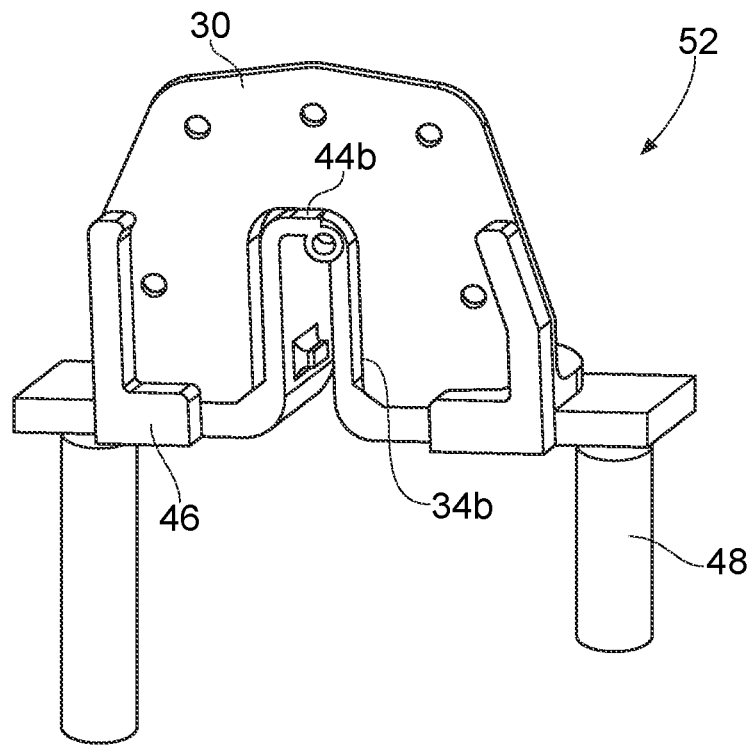
FIG. 6 shows the rib foot cleat on the tool.

The tool 40 shown in FIG. 5 has locating features 46 that are configured to support the rib foot cleat when positioned on the tool, as shown in FIG. 6. Locating features 46 may be a protrusion used to support the first attachment flange 30 and/or the second attachment flange(s) 32. Locating features 46 support the rib foot cleat 21 while channel lips 56 are being formed and (at least partially) cured, as described below. The features 46 may be temporarily clamped to the flange 30 by means of suitable spring c-clamps or similar to reduce the possibility of the tool from moving during the formation and the curing of the lips 56.

Once the tool 40 is inserted into the rib foot cleat 21 (or vice versa), sealant is inserted, e.g. pasted or injected, into the recesses, 44a and 44b. Preferably, a nozzle with a narrow, preferably tapered tip is used to insert the sealant. The narrow tip ensures that once inserted, the nozzle can be used to insert the sealant into the bottom of recesses 44a and 44b (as shown in FIGS. 5 and 6). This ensures that the sealant is fully inserted in the recesses 44a and 44b and reduces the likelihood of air bubbles forming in the resulting channel lips 56.

The shape of the recesses 44a and 44b can be modified depending on the desired final shape of the channel lips 56 to be formed. The resulting channel lips 56 are allowed to cure while the tool 40 remains supporting the rib foot cleat. This ensures the channel lips adhere to the rib foot cleat channel 34. The channel lips 56 may be cured faster by heating channel lips 56 during the curing process. This is done by heating the tool 40 and the rib foot cleat after the sealant has been inserted into the recesses 44a and 44b. Any suitable form of heat treatment may be used. This reduces the time required to manufacture the channel lips 56. Once the channel lips have cured, the tool 40 is removed.

As shown in FIG. 5, tool 40 may have a flexible 'hinge' line 45 along the middle of the tool. Once the channel lips 56 have cured, the tool may be collapsed by rotating or flexing about line 45 to permit easy dismantling of the tool without disturbing the channel lips 56. Tool 40 may further comprise handles 48 to help facilitate manually collapsing the tool within the rib foot cleat 21. However, it well be understood that hinge line 45 may be at along any position of the tool to permit collapse. Any flexible, semi-rigid, or hinge jointed rigid construction of the tool body 42 that enables the tool the collapse about the rib foot cleat 21 to enables removal of the rib foot cleat after forming the channel lips 56 would be suitable.

The tool may be made of any material, such as metal or plastic, but preferably, the tool is manufactured by additive manufacturing. The tool may be made of ABS, PLA, PC but preferably, is made of nylon. Manufacturing the tool body 42 from nylon allows the sealant to be supported in position to cure, but does not encourage the sealant to adhere to the tool, thereby facilitating easy removal of the tool without requiring any undesirable release agent. The surface of the tool 40 may also be polished to further discourage the sealant from adhering to the tool. This may be done by any suitable method, such as heat treating or burnishing the tool to re-melt the surface of the tool after printing or rubbing the surface of the tool 40.

A release agent may also be used on the tool 40 to further discourage the sealant adhering to the tool. The tool 40 may be coated with the release agent prior to forming the channel lips 56. Preferably, once the channel lips 56 are formed, the tool 40 is cleaned to remove any residual release agent, before a new layer of release agent is coated on the tool. The release agent may be any suitable release agent, such as sodium alginate. FIG. 7 shows the rib foot cleat arrangement 56, with rib foot cleat 21 removed with the tool, with channel lips 56 formed on the first opening rim 34a and second opening rim 34b of the cleat body 34.

Figure 8:
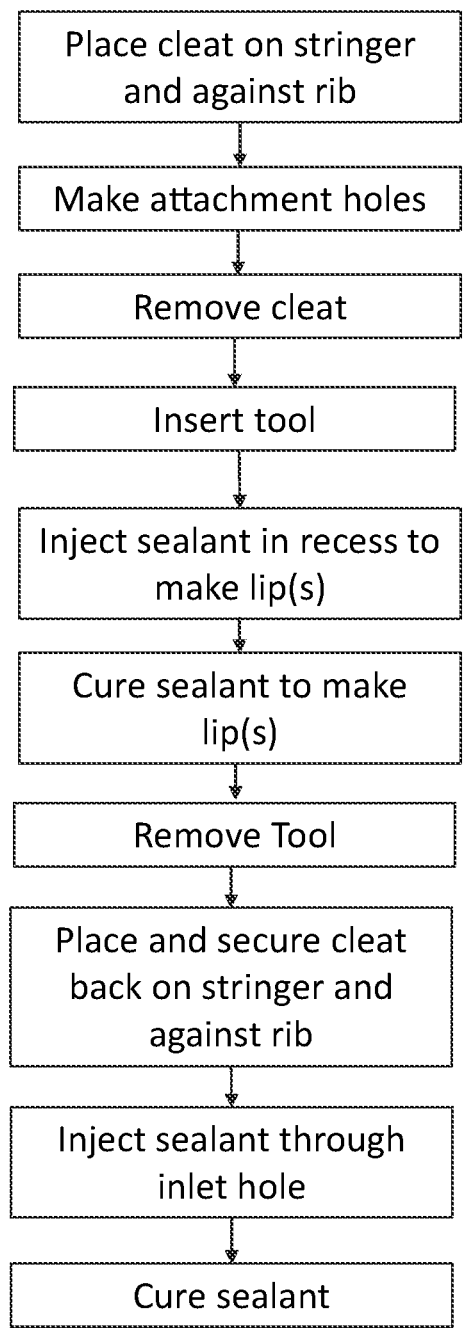
FIG. 8 shows the process of forming channel lips and arranging a rib foot cleat over a stringer and injecting sealant to seal a mouse hole between a rib and stringer.

FIG. 8 shows the steps of assembling the rib foot cleat 21, with optional steps for forming the channel lips 56. The rib foot cleat is placed against the rib 12 and arranged over the stringer 14a to identify the final position of the rib foot cleat. The rib foot cleat should be centred on the stringer. Fastener holes 28 are drilled off through the rib foot cleat 21 (and the rib and the stringer foot) before removing the cleat from the rib 12 and stringer 14a. The injection (or inlet) hole 26 may be formed in the cleat body 24 at any time prior to offering up and drilling off the fastener holes 28. Alternatively the inlet hole may be formed before forming the lips, or alternatively, the inlet hole may be made after the sealant lips have been made.

Once the rib foot cleat 21 has been removed from the rib 21, the fastener holes 28 may be cleaned and deburred before the rib foot cleat is then offered up again to the rib for final fasteners installation.

Where the optional channel lips are to be formed on the rib foot cleat, after drilling off the fastener holes, the tool 40 is inserted in the rib foot cleat (or vice versa) and sealant is injected into recesses 44a and 44b and left to cure. Once the channel lips 56 have been cured, the tool 40 is removed.

The rib foot cleat 21 is then arranged on the stringer 14a and against rib 12, before final fasteners are installed in the rib foot cleat 21 using the fastener holes 28 to fasten the rib foot cleat 21 to the rib 12 and the foot of the stringer 14a.

Figure 10:
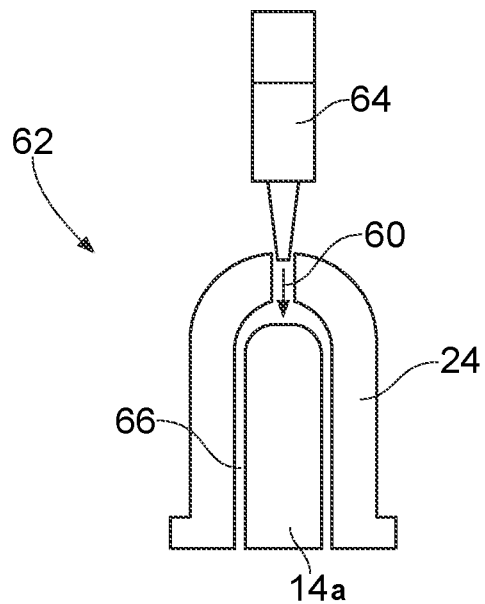
FIG. 10 is a cross section of the rib foot cleat body and a flow of injected sealant.

Once fastened, sealant 60 is injected through sealant injection hole 26, as shown in FIGS. 9 and 10. Sealant 60 is injected through the injection hole 26 to fill gap 66 (shown in FIG. 10) between the cleat body 24 and stringer 14a. The sealant is injected until sealant visibly protrudes from the rib foot cleat channel 34. This allows an easy method of fully sealing rib foot cleat 21 after it has been secured to the rib 12 and over the stringer 14a. This also ensure reliability of the seal as visual inspection reduces the probability of forming an incomplete seal. The injectable sealant provides faster installation of the rib foot cleat 21.

The sealant injected into the channel of the rib foot cleat fills the gap 66 between the stringer profile and the interior of the cleat channel 34 to fully seal the cavity and prevent fuel from moving through the mouse hole 16.

As mentioned above, the injectable sealant 60 is preferably made of the same type of material as the sealant used to form the channel lips 56. This is advantageous as once the injected sealant is cured, it will fuse with the channel lips 56 and form one cohesive seal in gap 66. This is advantageous as this promotes an effective seal.

The injectable sealant 60 may be introduced by any suitable means, but preferably the injectable sealant 60 is supplied from a pre-filled sealant cartridge 64 with a nozzle attached which is placed within a gun (not shown). The gun may use mechanics, air pressure or electromechanical drives to facilitate quick injection of the injectable sealant 60. FIG. 10 shows a cross section 62 of the cleat body 24 with sealant in the cartridge 64 injecting sealant using flow of sealant 60. As shown, the flow of sealant 60 will go through inlet hole 26 and around stringer 14a, filling gap 66. The nozzle may be extended in length or bent appropriately in order to assist access into areas which are difficult to access within the wing assembly.

While the invention relates to providing a fuel tight boundary between a dry bay and fuel bay within an aircraft, it will be understood that similar designs may be implemented in any boundary within a wing, aircraft, or any other industry.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A rib foot cleat for sealing around a stringer passing through a rib mouse hole in an aircraft assembly, the rib foot cleat comprising:
   a cleat body configured to attach to a rib at the rib mouse hole configured to be arranged over the stringer; and
   an injection hole through the cleat body in fluid communication with the cleat channel and configured to allow a sealant material to be injected through the injection hole into the cleat channel for sealing around the stringer,
   wherein the cleat body has an interior surface configured to face the stringer such that a cleat channel is defined between the interior surface and an outer surface of the stringer;
   wherein the cleat channel is U-shaped in cross section and terminates at a first channel opening rim on first side of the cleat body and at a second channel opening rim on a second side of the cleat body which is opposite the first side,
   wherein the cleat body includes at least one channel lip extending beyond the interior surface towards the stringer and extending at least partially around the interior surface defining the cleat channel, and
   wherein the at least one channel lip is adjacent the first and/or second channel opening rim.

2. The rib foot cleat of claim 1, wherein the channel lip is configured to delimit the sealant material injected through the injection hole and configured to extend from the interior surface of the cleat channel into a gap between the interior surface and the stringer.

3. The rib foot cleat of claim 2, wherein the channel lip on an interior surface of the cleat channel and the channel lip is made of sealant or a closed cell foam.

4. The rib foot cleat of claim 3, wherein the sealant of the channel lip is made from a curable material, such as silicone, polyurethane, polysulphide, or silane-modified polymer.

5. The rib foot cleat of claim 1, wherein the cleat body further comprises a first attachment flange for attaching the cleat body to the rib, and/or a second attachment flange for attaching the cleat body to a foot of the stringer.

6. The rib foot cleat of claim 1, wherein the cleat body is made of metal.

7. An aircraft assembly comprising:
   a stringer reinforced cover and a rib having a mouse hole with the stringer passing through the mouse hole in the rib, and;
   a rib foot cleat according to claim 1, arranged over the stringer at the rib mouse hole and with cured sealant material inside the rib foot cleat which seals around the stringer passing through the rib mouse hole.

8. The aircraft assembly according to claim 7, wherein the rib has a plurality of mouse holes each having a respective stringer passing through, and a respective rib foot cleat with cured sealant material which seals around the respective stringer passing through the respective rib mouse hole.

9. The aircraft assembly according to claim 7, wherein the rib forms a fuel tank boundary, and the rib foot cleat and the sealant material form a fluid-tight seal.

10. The aircraft assembly according to claim 9, wherein the rib forms a boundary between a fuel tank and a dry bay, or between a fuel tank and another fuel tank.

11. A method for sealing around a stringer passing through a rib mouse hole in an aircraft assembly, comprising:
   providing a rib and a stringer extending through a mouse hole of the rib;
   arranging a rib foot cleat over the stringer; attaching the rib foot cleat to the rib, wherein the rib foot cleat includes a cleat channel that is U-shaped in cross section and terminates at a first channel opening rim on first end of the rib foot cleat and at a second channel opening rim at a second end of the rib foot cleat opposite the first end,;

injecting sealant through an injection hole in the rib foot cleat to fill a gap between the cleat channel and the stringer with sealant to seal the gap, and confining the sealant to the gap by the cleat channel and the stringer by at least one channel lip extending beyond an interior surface of the cleat channel towards the stringer and extending at least partially around the interior surface defining the cleat channel, wherein the at least one channel lip is adjacent the first and/or second channel opening rim.

12. The method according to claim 11, further comprising drilling off holes through the rib foot cleat and the rib after arranging the rib foot cleat over the stringer and before attaching the rib foot cleat to the rib.

13. The method according to claim 11, further comprising drilling off holes through the rib foot cleat and the rib after arranging the rib foot cleat over the stringer and before attaching the rib foot cleat to the rib and wherein the lip(s) are formed after drilling off the holes in the rib foot cleat and before the rib foot cleat is attached to the rib.

14. The method according to claim 11, wherein the sealant is injected in the injection hole by air pressure injection.

15. The method according to claim 11, wherein a flow of injected sealant is stopped when sealant escapes from the cleat channel.

16. A tool for forming a lip on a rib foot cleat having a cleat body defining a cleat channel configured to be arranged over a stringer, and an attachment flange for attaching the cleat body to a rib, wherein the cleat channel includes a U-shaped inner surface that terminates at a first channel opening rim on one side of the cleat body and at a second channel opening rim on an opposite side of the cleat body, the tool comprising:

a tool body including a U-shaped outer surface configured to be placed against the U-shaped inner surface of the cleat channel of the rib foot cleat, wherein tool body having at least one recess in the U-shaped outer surface and the at least one recess extends at least partially around the U-shaped outer surface, wherein, while the tool body is seated on the U-shaped outer surface, the at least one recess is aligned with the U-shaped inner surface of the cleat channel is aligned adjacent the first channel opening rim and/or the second channel opening rim; and a locating feature for aligning the tool body against the cleat body of the rib foot cleat.

17. The tool of claim 16, wherein the tool body comprises two respective recesses that extend around an interior of the cleat channel adjacent the respective first and second channel opening rim.

18. The tool of claim 16, wherein the tool is collapsible and the tool body is flexible.

19. The tool of claim 18, further comprising at least one handle for manually collapsing the collapsible tool.

20. The tool of claim 16, wherein the tool is made of nylon.

21. A method of forming a lip on a rib foot cleat having a cleat body defining a cleat channel configured to be arranged over a stringer, and an attachment flange for attaching the cleat body to a rib, wherein the cleat channel is U-shaped and terminates at a first channel opening rim on one side of the cleat body and at a second channel opening rim on an opposite side of the cleat body, the method comprising:

providing the tool of claim 18;

inserting the tool in the rib foot cleat such that the tool body is be placed against the cleat channel of the rib foot cleat;

injecting sealant in the at least one recess of the tool body;

curing the sealant, and;

removing the tool.

* * * * *